Figure 2:
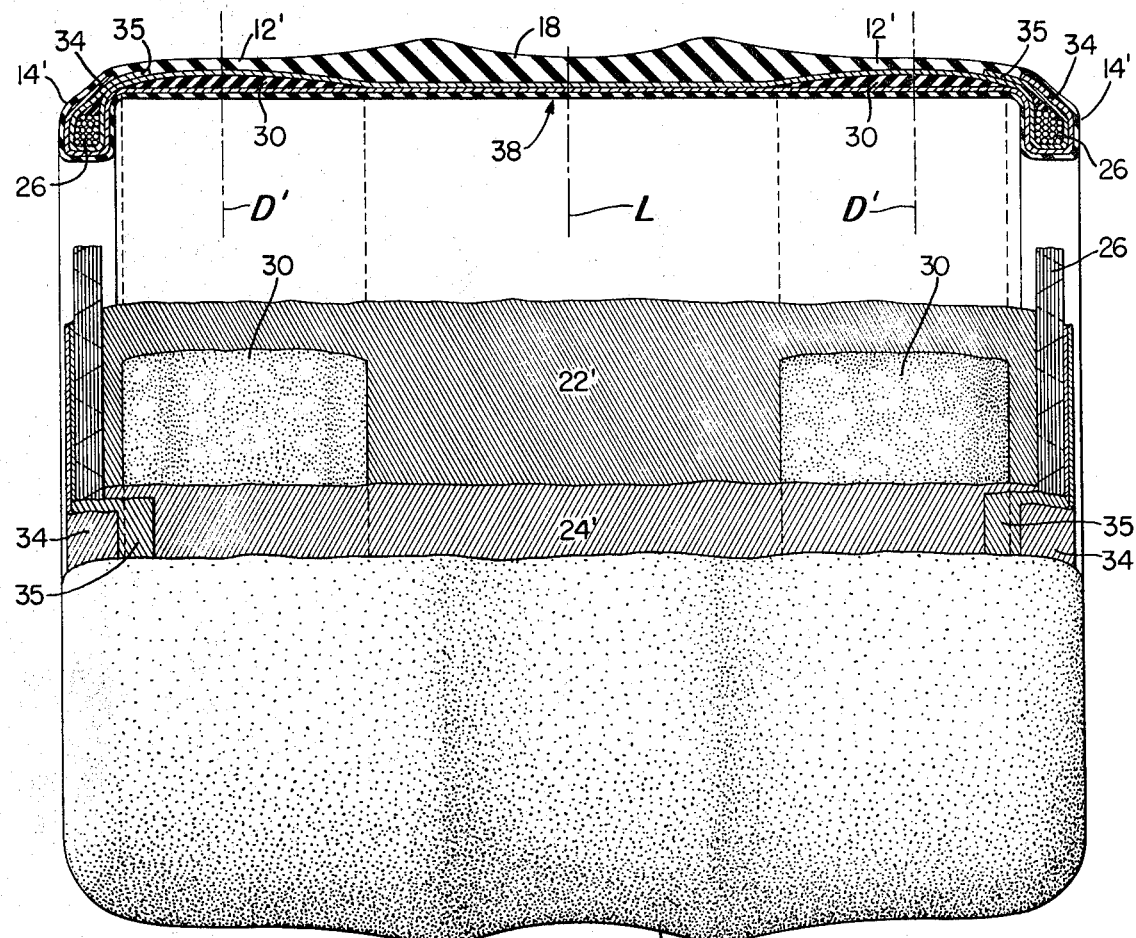

United States Patent

[11] 3,542,108

| [72] | Inventors | Grover W. Rye<br>Cuyahoga Falls;<br>David M. Callahan, Stow, Ohio |
|---|---|---|
| [21] | Appl. No. | 731,520 |
| [22] | Filed | May 23, 1968 |
| [45] | Patented | Nov. 24, 1970 |
| [73] | Assignee | The Goodyear Tire & Rubber Company<br>Akron, Ohio<br>a corporation of Ohio |

[54] TIRE
12 Claims, 2 Drawing Figs.

[52] U.S. Cl. .................................................. 152/360,
152/354
[51] Int. Cl. ............................................... B60c 9/06
[50] Field of Search .......................................... 152/354,
355, 356, 360, 374

[56] References Cited
UNITED STATES PATENTS

| 1,530,574 | 3/1925 | Paull ............................ | 152/354 |
| 1,855,560 | 4/1932 | Preyer ........................ | 152/355 |

FOREIGN PATENTS

| 1,490,674 | 6/1967 | France ........................ | 152/354 |

Primary Examiner—Arthur L. La Point
Attorneys—F.W. Brunner and R.S. Washburn

ABSTRACT: A pneumatic tire having improved circumferential or rolling uniformity and reduced vibration or noise transmission is provided by separating the reinforcing plies from one another at or near the mean radial extent of the tire sidewall by a resilient elastomeric annular strip disposed between the plies in the sidewall of the tire.

Patented Nov. 24, 1970

3,542,108

INVENTORS
GROVER W. RYE
DAVID M. CALLAHAN

BY

*R.S. Washburn*

AGENT

TIRE

The present invention relates to a pneumatic tire and particularly to a tire construction which provides a marked reduction in vibration or sound communicated to the vehicle by or through the tire on which the vehicle is mounted. The continuing development of vehicles for passenger and cargo transport over increased distances and at higher speeds has, in recent years, brought about greater awareness of noise and vibration. Vibration, and in some cases noise, may be generated within tires of conventional construction. Vibration, including audible vibration or noise, also can be transmitted by the tire structure from a road surface to the vehicle on which the tire is mounted.

Vibrations within certain frequency ranges or in the vicinity of certain frequencies tend to become particularly objectionable in certain vehicles, and particularly so if components of such vehicles or of their suspension systems tend readily to communicate such vibrations to the passengers or lading.

In conventional tire construction heretofore the cord or fabric plies have been superposed one upon the other directly, the cords or reinforcing elements being separated only by a minimum uniform thickness of rubber or rubberlike material. This thin coating on the cord fabric is sometimes referred to as a skim coat, or as squeegee. It has heretofore generally been thought to be desirable to associate the plies closely to one another.

A principal object of our invention is to produce a novel and improved tire which overcomes the mentioned disadvantages of previously available tires; a tire having improved circumferential uniformity; and, in which tire the generation and transmission of vibration including audible noise are eliminated or significantly reduced.

According to the invention the objects are achieved by the provision of a pneumatic tire having a pair of opposed annular sidewalls each concentrically connected to a bead portion and to a tread portion and comprising at least two adjacent reinforcing plies extending from one to or toward the other of said bead portions and including means separating the pair, or each pair of plies in the form of an annular circumferentially continuous strip of generally lenticular cross section. The strip provides for increasing the spacing of one of the said adjacent plies from the other only in the sidewalls, or one of them, at or near the mean radial dimension thereof and by a distance or thickness not less than the thickness of the thinner ply of said plies. The annular strip is preferably of an elastomeric material. It extends radially from the bead portion of the tire to or toward the outer extremity of the sidewall where the sidewall is connected to the tread portion of the tire. We have discovered that this interply cushion strip spacing apart or separating the plies only in the sidewalls produces a marked improvement in the circumferential uniformity of the tire both as measured in the laboratory and in the road performance of the tire. The performance characteristics of the novel and improved tire, such as the quality or ride and the reduced degree of vibration and noise communicated to the vehicle are significantly improved. Deflections of the tire responsive to a constant force applied radially to the rotating tire in laboratory tests have been found to be markedly more uniform around the tire as compared to deflections of tires constructed in accordance with the prior art practice under the identical tests. We have also found a particular advantage in the reduction or damping of vibrations in a range including 180 cycles per second and generally within a range of from 160 cycles per second to 200 cycles per second, as well as more generally over the frequency range of 40 to 750 cycles per second.

Figure 1:
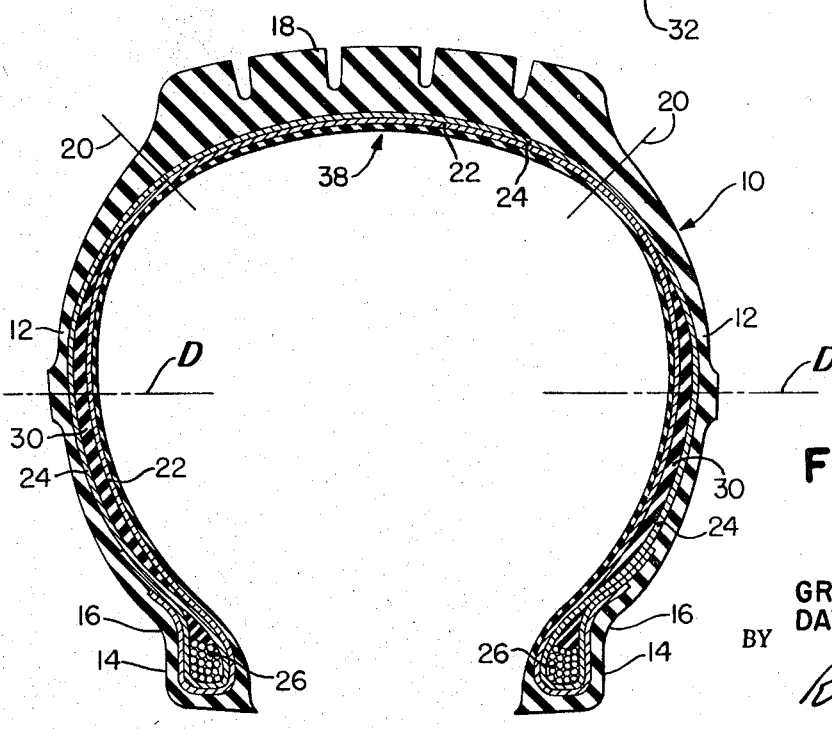

Further objects and advantages of the instant invention will be pointed out or will become apparent as the description of a specific embodiment proceeds, making reference throughout to the attached drawing, in which:

FIG. 1 is an elevational view of an uncured tire according to the instant invention in its flat band or cylindrical form, as built, portions thereof being broken away to show details and features thereof; and FIG. 2 is a transverse sectional view of a completed tire according to the instant invention, the tire having been shaped and cured.

As shown in the drawing, and particularly FIG. 1, a pneumatic tire 10 includes a pair of opposed sidewalls 12 each concentrically joined to a bead portion 14 at the radially inner terminus 16 of the respective sidewall 12 and to a tread portion 18 at the radially outward extremity 20 of each of the sidewalls 12. A pair of reinforcing cord plies 22, 24 extend from one to the other of the bead portions 14 and are wrapped around substantially inextensible bead core members 26 in the usual manner. In accordance with the principles of the instant invention the tire 10 includes means separating the pair of plies one from the other at about the mean radial dimension, represented by D in FIG. 1, of the sidewalls in the form of an annular member disposed between the pair of plies 22, 24 which member is a circumferentially continuous annular strip 30 of elastomeric material.

While a tire according to the present invention can be constructed by any conventional procedure, a particularly convenient method is illustrated in FIG. 2, wherein the successive elements comprising a complete tire such as the tire 10 are assembled in the form of a flat band or cylindrical body 32. When the elements are completely assembled the flat band tire body 32 is removed from the building drum or form (not shown) and is then shaped and cured to provide the completed tire 10, FIG. 1.

The tire body 32 includes a pair of plies 22', 24' extending from one to the other of the bead portions 14' where the axial extremities 34, 35 of the plies 22', 24' are turned about the beads 26 in the usual manner. The cords of which the plies are made may be of any known suitable material, exemplified by but not limited to rayon, nylon or polyester. Cords of polyester filament have been found to perform with advantage in the practice of the invention.

In accordance with the present invention means spacing, or providing a separation between, the pair of plies 22, 24 within a portion of the sidewall 12 of the tire is provided by the annular strips 30 of elastomeric material which lie circumferentially about the inner ply 22' of the pair and are in turn encompassed by the outer ply 24' of two adjacent plies. Prior to assembly into the tire the reinforcing cords of the plies are coated as previously mentioned herein with a thin substantially uniform coating of rubber in the usual manner. The pair of plies 22', 24' are contiguous one to the other in the crown region 38 of the tire 10, but are separated in the sidewall portions 12' particularly at or near the mean radial dimension indicated generally by the line D' of the sidewall. The amount of the separation between the plies 22 and 24 is not less than the thickness of one of the plies. The cords of the reinforcing plies are, of course, insulated from the cords of the adjacent ply uniformly by a thin layer of rubber. Notably, however, the separation between the plies 22 and 24 in the sidewall 12 and particularly near or at the middle or the mean radial dimension of the sidewall 12 is by distance or spacing which is appreciably greater than the spacing between the plies in the crown or the bead portions of the tire.

Divers means may be used to provide the desired separation between the plies in one or the other or both of the sidewalls of the tire. In particular the member 30 according to the invention may be of any suitable material. The presently preferred separating means is in the form of a circumferentially continuous annular strip 30 of elastomeric material which is characterized by a hot rebound measurement of 80 to 90 percent as measured by the well known Goodyear-Healey Pendulum Rebound Tester. This measurement is well known to those skilled in the art of rubber compounding and consists in warming a sample of the material to a temperature of 210°F., letting a small tup or hammer fall against the warmed sample and measuring the percent of the original height to which the elastic rebound being measured returns the tup.

The annular member of strip 30 is applied to the circumference of the innermost 22' of the two plies 22', 24' in its uncured state and is conveniently of the same composition as that used to skim-coat the cords of the reinforcing plies. The member 30 may be applied in a variety of cross-sectional shapes and in a single turn or several turns about the ply 22' on the tire building drum (not shown). During the application of the outermost 24' of the pair of plies 22', 24' and the wrapping thereabout of the tread 18 and sidewall 12 components, the member or insert 30 will begin to assume a generally lenticular shape in cross section. The thickness of the insert or member 30 in accordance with the invention will separate the pair of plies 22', 24' at about the mean radial dimension of the sidewall by not less than the thickness of the thinner of the pair of plies and preferably by an amount ranging from about 0.75 mm (0.03 inch) to 5.0 mm (0.20 inch) in thickness. Thicknesses of from 1.5 mm to 3.0 mm (0.06 to 0.12 inch) have been found advantageous in a passenger car tire of 8.25 × 14 size. The cross-sectional width of the member in the finished, shaped and cured tire does not exceed the annular width of the sidewall from its connection 16 with the bead portion at its radially inner terminus to its connection with the tread or crown portion at the outer radial extremity 20 of the sidewall. Sufficient material is supplied to form the member 30 so that its minimum radial width will be substantial. The strip 30 is located so that the desired separation between the plies at about the means radial dimension of the sidewall will be obtained. The cross-sectional width of the insert may range from a minimum of about 10 percent of the sidewall radial dimension to about 70 percent. In the 8.25 × 14 tire mentioned the strip measured about 10 cm (4 inches) in width and was placed about 15 cm (6 inches) from the mid-circumferential center line L of the tire, as seen in FIG. 1.

We have discovered that tires in accordance with the invention and particularly tires including the sidewall insert or member described hereinabove are significantly improved in circumferential uniformity and achieve a reduction in the transmission of vibration or noise between the tire and the vehicle on which the tire is mounted, particularly vibrations in the 160 to 200 cycles per second range. A reduction in noise from 84 to 86 decibels, sound level, as measured with a tire of the prior art; to 78 decibels, sound level, with a tire constructed in accordance with the present invention has been achieved.

While the particular embodiment herein has been described as a two-ply tire by way of example, the invention finds utility in tires of other constructions, for example, in tires having more than two plies, having bias laid plies or radial plies, having either breaker, or restrictive belt ply or plies, ratios of section height to section width which may be large or small, and for inflation pressures which range from high to low. The advantages discussed herein, such as improved circumferential or rolling uniformity, reduced noise and vibration characteristics are effective, improving the performance in the described aspects in each case. The advantages are notably obtained in low profile tires, i.e., tires or low ratio of section height to section width.

In the present embodiment the two-ply tire includes reinforcing cord plies disposed to define at and with the central rotational plane of the tire equal and opposite acute angles, these angles in the present embodiment being about 36°.

In tires having cord plies disposed at the angular relation described, usually called bias ply construction, the cords of alternate and next adjacent plies are disposed at generally equal and opposite angles in the sidewall, or sidewalls, with respect to a radial plane containing the tire axis. In radial ply tires, the cords of the plies lie generally in radial planes containing the tire axis. The strip or insert 30 described herein separates the, or each, pair of plies from each other in the midannular portion of the sidewalls radially outward from the bead portion and radially inward from the shoulder regions or outer extremities of the respective sidewalls. Relative movement of cords of one ply in response to flexure of the sidewall are made relatively independent of movement of cords of an adjacent ply. In particular, interference or crossrubbing of cords of one ply against those of another are completely eliminated.

While certain representative embodiments and details have been shown for the purpose of illustrating the invention, it will be apparent to those skilled in this art that various changes and modifications may be made therein without departing from the spirit or scope of the inventor.

We claim:

1. A pneumatic tire having a pair of opposed sidewalls each concentrically joined to a bead portion and to a crown portion and comprising a pair of reinforcing cord plies extending from one to the other of the bead portions, and cushion means separating said pair of plies at the mean radial dimension of at least one of said sidewalls to a spacing between said plies greater than the spacing between said plies in the crown or bead portions of the tire, said means extending from the mean radial dimension in opposing directions towards the bead and crown portions.

2. A tire as claimed in claim 1 wherein said means provides spacing between said pair of plies which is greater at the mean radial dimension of said sidewall than the spacing between said plies in the crown or bead portions by an amount not less than the thickness of one of the plies.

3. A tire as claimed in claim 1 wherein said means comprises a member disposed between said pair of plies.

4. A tire as claimed in claim 3 wherein said member comprises a circumferentially continuous annular strip of elastomeric material having a generally lenticular cross section of from 0.03 inch to 0.20 inch in thickness and of substantial radial width.

5. A tire as claimed in claim 3 wherein said member comprises a circumferentially continuous annular strip of elastomeric material having a generally lenticular cross section of from 0.03 inch to 0.20 inch in thickness and of radial width of from about 10 percent to about 70 percent of the radial width of said sidewall.

6. A tire as claimed in claim 1 wherein said tire is of the tubeless type and said plies include reinforcing cords respectively disposed to define at and with the central rotational plane of the tire equal and respectively opposite acute angles.

7. A tire as claimed in claim 1 comprising means for attenuating vibrations communicated by said sidewalls to said bead portions including said means for separating said pair of plies.

8. A tire as claimed in claim 1 wherein said tire is a two-ply tire and the reinforcing cords of said plies define equal and respectively opposite angles of about 36° at and with the central rotational plane of said tire.

9. A pneumatic tire subject to varying deflection when inflated and supporting a moving load, said tire including a tread portion, a pair of bead portions, and opposed sidewall portions each extending from one of said bead portions to said tread portion, comprising in at least one of said sidewalls a pair of reinforcing cord plies the cords of which respectively make generally equal and generally opposite angles in the sidewall with respect to a radial plane containing the tire axis, said cords being of a material selected from the group consisting of rayon, nylon, polyester, glass fiber, and metal wire filaments, and cushion means separating one of said plies from the other at the mean radial dimension of the sidewall, said means extending from the mean radial dimension in opposing directions towards the bead and crown portions.

10. A pneumatic tire having notably reduced transmission of noise between the tire and a vehicle wheel on which it is mounted, the tire including a pair of inextensible bead cores, a crown portion, and a pair of sidewalls connecting the tread and the beads, and means for inhibiting noise comprising a pair of reinforcing cord plies wrapped around one of said beads and extending in the sidewall and into the crown portion, and cushion means separating the pair of plies one from the other in the sidewall by a distance greater than the distance between said plies elsewhere in the tire, said means extending from the mean radial dimension of the sidewall in opposing directions towards the bead and crown portions.

11. The method of attenuating vibrations particularly in the audible frequency range communicated between a pneumatic tire and a vehicle on which the tire is mounted, said tire having sidewalls including at least two reinforcing cord plies, which method comprises separating said plies from one another by cushionable material at the mean radial dimension of at least one of said sidewalls by a distance greater than the distance between said plies elsewhere in the tire, said cushionable material extending from the mean radial dimension in opposing directions towards the bead and crown portions.

12. The method claimed in claim 11 wherein said separating of the plies is accomplished by placing an annular member of lenticular cross section between said plies, and then curing the tire.